US008845018B2

(12) United States Patent
Toll

(10) Patent No.: US 8,845,018 B2
(45) Date of Patent: Sep. 30, 2014

(54) BICYCLE SEAT

(75) Inventor: Steven G. Toll, Tampa, FL (US)

(73) Assignee: Tampa Bay Recreation, LLC, Tampa, FL (US)

( * ) Notice: Subject to any disclaimer, the term of this patent is extended or adjusted under 35 U.S.C. 154(b) by 0 days.

(21) Appl. No.: 13/142,133

(22) PCT Filed: Aug. 9, 2010

(86) PCT No.: PCT/US2010/044868
§ 371 (c)(1),
(2), (4) Date: Jun. 24, 2011

(87) PCT Pub. No.: WO2011/019650
PCT Pub. Date: Feb. 17, 2011

(65) Prior Publication Data
US 2011/0298253 A1    Dec. 8, 2011

(51) Int. Cl.
*B62J 1/00*    (2006.01)
(52) U.S. Cl.
CPC . *B62J 1/002* (2013.01); *B62J 1/007* (2013.01)
USPC .................................. 297/214; 297/195.1
(58) Field of Classification Search
CPC ............... B62J 1/00; B62J 1/002; B62J 1/007
USPC ................ 297/195.1, 201, 214, 215.16
See application file for complete search history.

(56) References Cited

U.S. PATENT DOCUMENTS

| | | | |
|---|---|---|---|
| 642,191 A | 1/1890 | Wright | |
| 464,653 A | 12/1891 | Latta | |
| 532,444 A * | 1/1895 | Christy | 297/202 |
| 537,375 A * | 4/1895 | Wright et al. | 297/201 |
| 568,626 A | 9/1896 | Pierce et al. | |

(Continued)

FOREIGN PATENT DOCUMENTS

| EM | 000674577-0001 | 3/2007 |
|---|---|---|
| JP | 2008-509047 | 3/2008 |

(Continued)

OTHER PUBLICATIONS

Ilan Leibovitch, Yoram Mor, "The Vicious Cycling: Bicycling Related Urogenital Disorders", European Urology 47, pp. 277-287 (2005).

(Continued)

*Primary Examiner* — Philip Gabler
(74) *Attorney, Agent, or Firm* — Neifeld IP Law

(57) ABSTRACT

A split-nose bicycle seat, comprising; rigid plastic base provided with attachment points for mounting the seat to the bicycle frame, a total length of the seat of about 260-280 mm, a split nose section formed by two elongated protrusions of substantially constant width extending forward from a media! section to a front surface; said elongated protrusions angle inwardly and have a total width of at least 60 mm at a station 30 mm aft of the front surface, a cushioned pubis bone support surface with a substantially flat side profile, arid a drooped nose section forward thereof defining a droop angle θ of about 22-28°; said split nose section transitioning aft to a media! section having a width of about 130-138 mm at the widest point of the seat, and a width of at least 98 mm at a station 50 mm forward of the widest point of the seat; said medial section transitioning aft to a rear-end section.

5 Claims, 10 Drawing Sheets

(56) References Cited

U.S. PATENT DOCUMENTS

| | | | |
|---|---|---|---|
| 570,497 A | | 11/1896 | Pattison |
| 572,062 A | * | 11/1896 | Peck .......................... 297/201 |
| 605,151 A | * | 6/1898 | Twist .......................... 297/202 |
| 608,682 A | | 8/1898 | Jamieson |
| 612,552 A | | 10/1898 | Standeford |
| 612,972 A | * | 10/1898 | Leech ......................... 297/202 |
| 619,204 A | | 2/1899 | Moore |
| 622,357 A | | 4/1899 | Hitchcock et al. |
| 623,238 A | | 4/1899 | Davis |
| 635,598 A | * | 10/1899 | Rowe .......................... 297/201 |
| 872,124 A | | 11/1907 | Hammaren |
| 1,538,542 A | | 2/1924 | Blake |
| 1,858,477 A | * | 5/1932 | Blake ......................... 297/202 |
| 3,844,611 A | | 10/1974 | Young |
| 4,429,915 A | | 2/1984 | Flager |
| 4,898,422 A | | 2/1990 | West |
| 4,999,068 A | | 3/1991 | Chiarella |
| 5,011,222 A | | 4/1991 | Yates et al. |
| 5,676,420 A | | 10/1997 | Kuipers et al. |
| 5,765,912 A | | 6/1998 | Bontrager |
| 5,863,094 A | | 1/1999 | Endo |
| 5,873,626 A | | 2/1999 | Katz |
| D409,009 S | | 5/1999 | Toll et al. |
| D417,560 S | | 12/1999 | Tollefson et al. |
| 6,019,423 A | | 2/2000 | Dodge et al. |
| 6,039,395 A | | 3/2000 | Culbertson |
| 6,113,184 A | | 9/2000 | Barnes |
| 6,193,309 B1 | * | 2/2001 | Gootter et al. ............. 297/202 |
| D454,258 S | | 3/2002 | Yates |
| 6,422,647 B1 | * | 7/2002 | Turudich .................... 297/201 |
| 6,450,572 B1 | * | 9/2002 | Kuipers ..................... 297/195.1 |
| 6,783,176 B2 | | 8/2004 | Ladson, III |
| 7,025,417 B2 | | 4/2006 | Cohen |
| 7,077,469 B2 | | 7/2006 | Badia i Farré |
| 7,121,622 B1 | | 10/2006 | Mendez |
| D575,070 S | | 8/2008 | Toll |
| 7,537,281 B2 | | 5/2009 | Riondato |
| D604,056 S | | 11/2009 | Toll et al. |
| D604,057 S | | 11/2009 | Toll |
| 7,699,391 B2 | | 4/2010 | Riondato |
| D622,973 S | | 9/2010 | Toll |
| 7,934,770 B2 | * | 5/2011 | Toll .............................. 297/202 |
| 2002/0117880 A1 | * | 8/2002 | Ladson, III ................ 297/201 |
| 2007/0069557 A1 | | 3/2007 | Toll |
| 2009/0079237 A1 | * | 3/2009 | Riondato ..................... 297/201 |

FOREIGN PATENT DOCUMENTS

| | | |
|---|---|---|
| WO | 99/14103 | 3/1999 |
| WO | WO 99-14103 | 3/1999 |
| WO | WO 2006/015731 | 2/2006 |
| WO | 2007/038692 | 4/2007 |
| WO | WO 2007-038692 | 4/2007 |

OTHER PUBLICATIONS

Eddy Randrup, M.D., and Neil Baum, M.D., "Bicycle Riding as a Cause for Erectile Dysfunction", www.medicalsexuality.org, pp. 26-27, (Nov. 2000).

S. J. Jeong. K. Park, J. D. Moon, and SB Ryu, "Bicycle Saddle Shape affects penile blood flow", International Journal of Impotence Research, 14, 513-517 (2002).

Ian R. Spears, Neil K. Cummins, Zoe Brenchley, Claire Donahue, Carl Turnbull, Shona Burton, and Gabrielle A. Macho, "The Effect of Saddle Design on Stresses in the Perineum during Cycling", Medical Science Sports Exercise, vol. 35, No. 9, pp. 1620-1625 (2003).

Eadric Bressel, and Brad J. Larson, "Bicycle Seal Designs and Their Effect on Pelvic Angle, Trunk Angle, and Comfort", Medical Science Sports Exercise, vol. 35, No. 2, pp. 327-332 (2003).

G. Breda, M.D., N. Piazza, M.D., V. Bernardi, M.D., E. Lundardon, M.D., and Adara Caruso, M.D., "Development of New Geometric Bicycle Saddle for the Maintenance of Genital—Perineal Vascular Perfusion," Journal of Sexual Medicine, vol. 2, Issue 5, pp. 605-611 (Sep. 2005).

Brian D. Lowe, Steven M. Schrader, and Michael J. Breitenstein, "Effect of Bicycle Saddle Designs on the Pressure to the Perineum of the Bicyclist", Medical Science Sports Exercise, vol. 36, No. 6, pp. 1055-1062 (2004).

Eadric Bressel, John Cronin, and Alicia Exeter, "Bicycle Seat Interface Pressure: Reliability, Validity, and Influence of Hand Position and Workload", Journal of Biomechanics, vol. 38, Issue 6, pp. 1325-1331 (Jun. 2005).

Eadric Bressel, Tracey Reeve, Dan Parker, John Cronin, "Influence of Bicycle Seat Pressure on compression of the perineum: a MRI Analysis," Journal of Biomechanics 40, pp. 198-202 (2007, Accepted Nov. 26, 2005).

International Search Report and Written Opinion for PCT/US2010/044868 dated Apr. 7, 2011.

* cited by examiner

BICYCLE SEAT

CROSS-REFERENCE TO RELATED APPLICATIONS

This application claims the benefit of U.S Design patent application Ser. No. 29/341,653, filed Aug. 10, 2009, incorporated herein by reference.

BACKGROUND

1. Technical Field

This invention relates to a bicycle seat which comfortably supports a bicycle rider.

2. Description of the Related Art

Bicycle seats have a generally horizontal profile with a narrow front-end section, the nose or horn, and a wider, flared tail section with a concave intermediate section for thigh clearance. They include a pliable, semi-rigid molded plastic, or nylon shell, over which conforming padding material is placed, and finally a leather, plastic, or vinyl cover is fitted.

A bicycle seat must support the rider comfortably for rides of long duration and aid the rider in controlling and stabilizing the bicycle. It is well known to bicycle riders that the conventional saddle can cause chafing, blistering, bruising, and possibly injury to the rider. A primary cause of discomfort is the pressure exerted on sensitive areas of the body (i.e. the sacral, coccal, ischial, and perineal/genital regions) when the weight of the rider rests on a traditional bicycle seat.

There have been various attempts in the prior art to design bicycle seats that provide greater comfort and hygienic safety.

In order to provide greater comfort to the rider, the prior art teaches pre-forming concave regions into the horizontal seat surface corresponding to the pelvic bone and perineum regions of the rider. The purpose is to reduce compression on the pudendal arteries and nerves while not interfering with movement of the rider's legs in the pedaling motion.

Another way to add comfort to a bicycle seat is by adding a cushioning material to the seat surface. A cloth cover or like material is selectively stuffed with a flexible and resisting material to form soft cushion lobes in strategically placed ridges to support the pelvic bones of the rider. However, excessive movement or grinding of the pelvic areas can cause bruising, groin pain, numbness, urethritis, neuritis, seat sores, and chafing.

These problems can be aggravated by friction and pressure t exerted on the blood vessels and nerves along the inner and underside of the rider's pelvic region. The front-end section (nose) of a traditional seat fits directly against the pelvic structures. This results in occlusion of arteries and veins supplying blood flow to the penis and clitoris, as well as, compression of local nerves as they are sandwiched between the nose of the bicycle seat and the bony structures of the anterior pelvis. The resultant outcome is a numbing effect or paresthesia, as reported by many cyclists that can result in sustained paresthesia of the groin and penis, delayed or immediate impotence, and perhaps even an elevated prostate specific antigen.

Recent studies have linked perinea pressure caused by traditional bicycle seats to urinary tract and yeast infections. Sitting on traditional bicycle seats can compress tender genital tissues against the seat causing irritation to the genitals.

In both male and female riders the crotch area contains nerves and pudendal arteries leading to the genetals. In the male, the pudendal artery carries blood flow that enables erection. Sitting on a traditional bicycle seat can increase the pressure in the pudendal arteries causing a decrease in blood flow for both men and women. This decrease in blood flow may cause numbness potentially leading to impotency in certain male bicycle riders. (Numbness is caused by compression of the pudendal nerve. However, compression of the artery is not something a rider feels.

In order to overcome these problems, the prior art provides seats with a groove at the nose portion of the bicycle seat, which results in a right side nose portion separated by a gap from the left side nose portion (split nose). The opening is intended to reduce the pressure but does not always work, and sometimes creates even more pressure exerted on the genital area by the rider's weight on the seat.

U.S. Pat. No. 6,193,309, to Gootter, et al., discloses a split nose seat design.

U.S. Des. Pat. No. 417,560, to Tollefson et al., teaches a split nose design that is essentially a traditional bicycle seat with a split nose; consequently the width of the nose section is relatively narrow, about 40 mm or less. Merely adding a gap to the narrow nose structure of a traditional saddle does not appear to provide much, if any, benefits.

An improved split-nose bicycle seat contoured to fully support the coccyx, sacrum, and ischium bones, while providing a relieved area for the perineum/genital regions, was disclosed by the present inventor in co-pending U.S. patent application Ser. No. 12/685,311, filed Jan. 11, 2010, incorporated herein by reference. This prior design provides support for the tissues and musculature surrounding the aforementioned pelvic areas.

However, there is still need for a seat which helps the rider to assume several differing positions on the seat while avoiding undesirable pressure on the rider's perineum. Primarily female riders, but some male riders too, have reported small areas of tenderness, contusions and abrasions to the perineal space of their bodies.

The front arms of my prior saddle are relatively flat on top, and, at the front ends feature 90 degree angles traveling to the bottoms of the base of the front arms. These regions of 90 degree angle support the rider's body at the top of the pubic rami, placing the rider's weight on both pubic rami and the superficial perineal space, and act as a point approximately 8 mm-15 mm in diameter which can create a pressure/friction area, causing contusions or abrasions of the perineum.

I have found that by extending the front arms further forward and providing, a downward slope to the nose area (drooped nose) this keeps the pubic rami supported comfortably by the front arms while the pudendal nerve and the pudendal artery remain free of compression, thereby avoiding abrasions within the perineal space.

I have also found that by increasing the width of the prior seat near the mid-section it reduces the vertical angle of the outside edges of the saddle and allows for reduced or softer contact with the adductor muscles in the legs and the hamstring muscles in the buttocks. This gentle side slope provides for more surface area to come into contact with the pubic rami and the superficial perineal space, and absorbs the contact pressure evenly over a larger area, reducing the isolated pressure point on the body. The pudendal artery and pudendal nerve continue to be free of compression with this new design.

SUMMARY

An object of the present invention is to provide a split-nose bicycle seat, comprising: rigid plastic base provided with attachment points for mounting the seat to the bicycle frame, a total length of the seat of about 260-280 mm, a split nose section formed by two elongated protrusions of substantially constant width extending forward from a medial section to a front surface; said elongated protrusions angle inwardly and have a total width of at least 60 mm at a station 30 mm aft of the front surface, a cushioned pubis bone support surface with a substantially flat side profile, and a drooped nose section forward thereof defining a droop angle θ of about 22-28°; said split nose section transitioning aft to a medial section having a width of about 130-138 mm at the widest point of the seat, and a width of at least 98 mm at a station 50 mm forward of the widest point of the seat; said medial section transitioning aft to a rear-end section.

The seat of the present invention provides full support of the pelvis plus improved accommodation for surrounding tissues and musculature via the tapering width in the medial section, and its sloping front section of defined angle θ. This slope provides for more surface area of the saddle to come into contact with the pubic rami and the superficial perineal space, to absorb the contact pressure more evenly over a larger area, and so reduce isolated pressure points on the body. That is, as the front end slopes away from the body the pressure on the perineum is eventually eliminated, but the saddle maintains full anatomical support of the pelvis.

DETAILED DESCRIPTION OF THE INVENTION

The bicycle seat of the present invention provides anatomic features which fully support the sacrum, coccyx, and complete ischium of the rider. It includes a rigid shell/frame, a cushioned area, and an outerwear surface.

Figure 1:
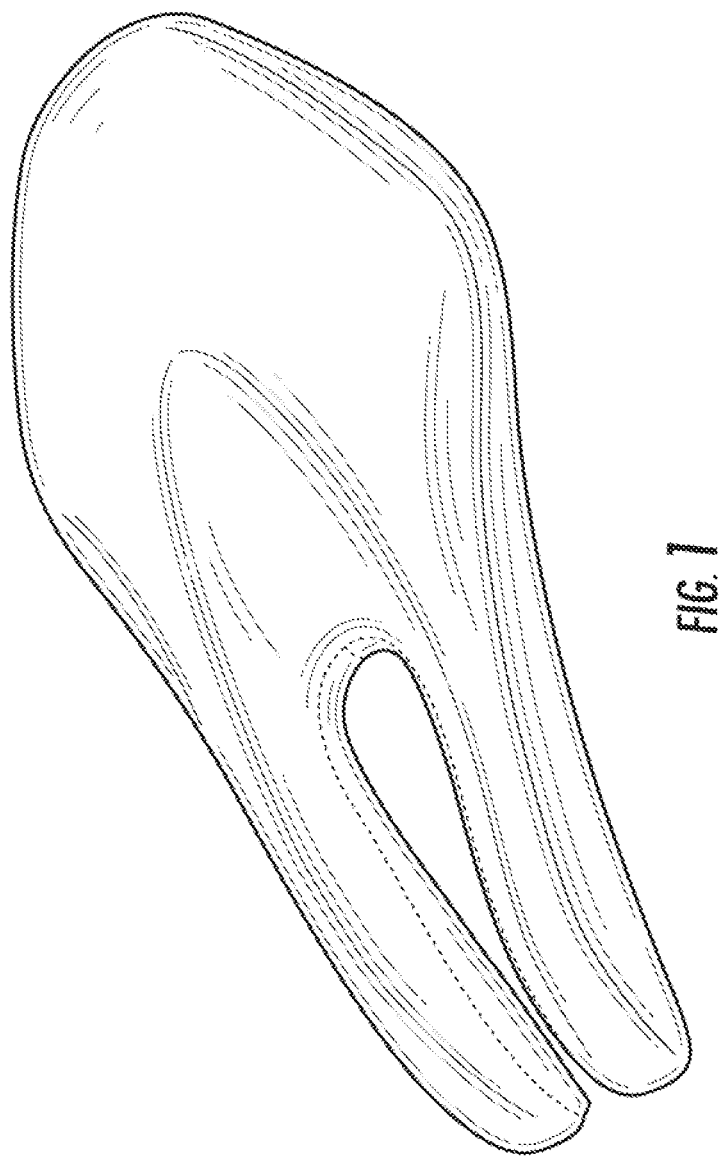
FIG. 1 is a perspective top view of a bicycle seat of the present invention.
Figure 2:
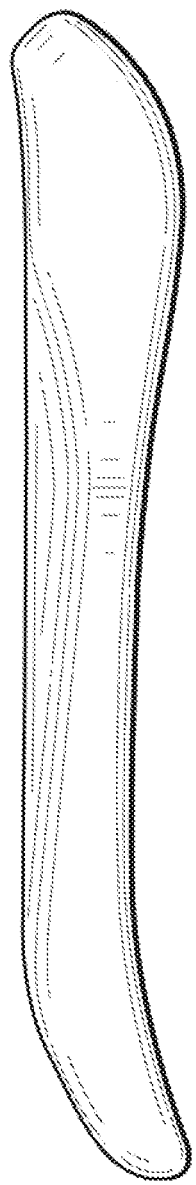
FIG. 2 is a side view of a bicycle seat of the present invention.
Figure 3:
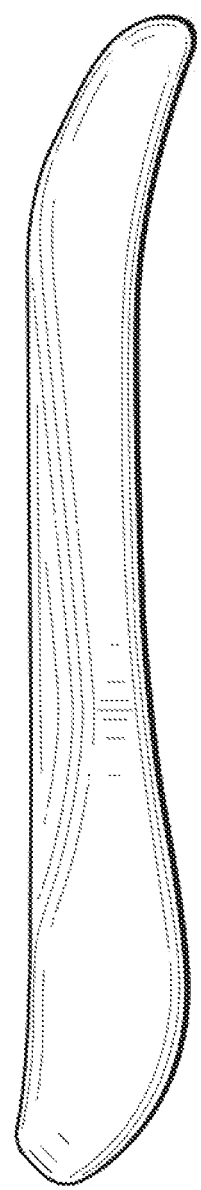
FIG. 3 is the opposite side view of a bicycle seat of the present invention
Figure 4:
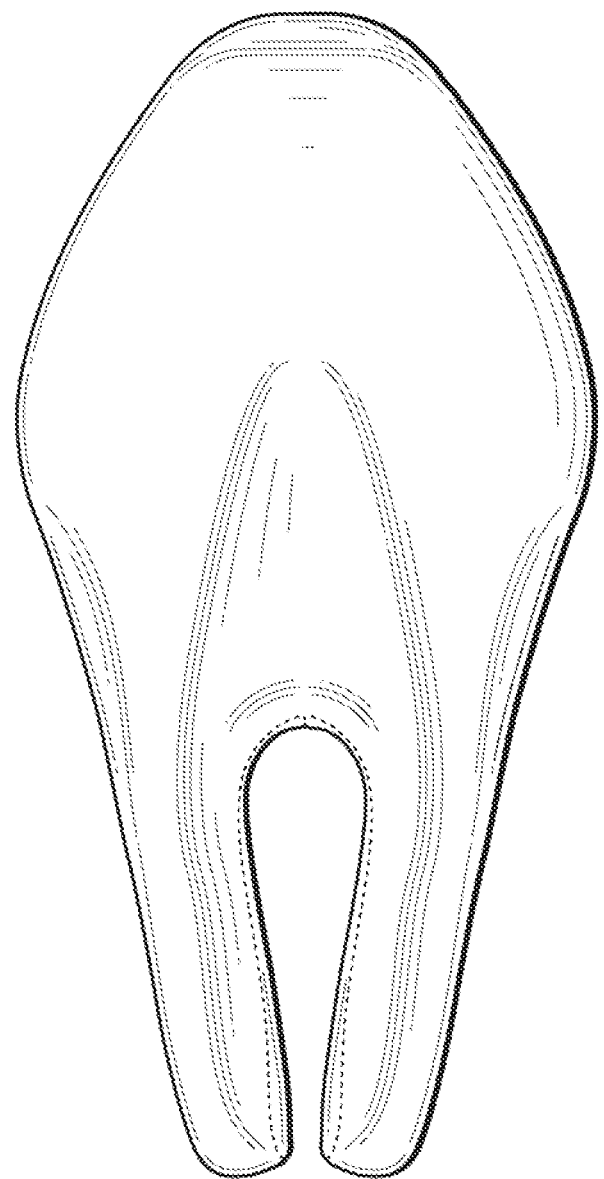
FIG. 4 is a top view of a bicycle seat of the present invention.
Figure 5:
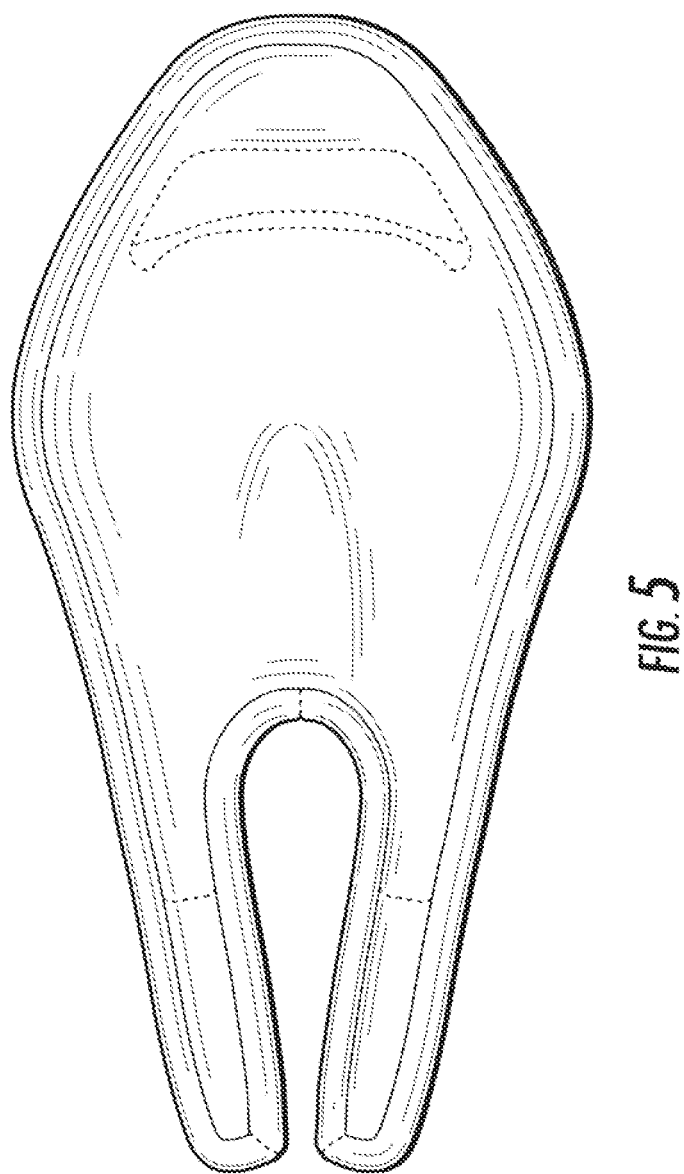
FIG. 5 is a top view of a bicycle seat showing molded structural attachment points on the bottom surface.
Figure 6:
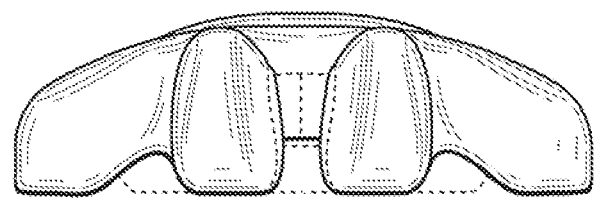
FIG. 6 is a front view of a bicycle seat of the present invention.
Figure 7:
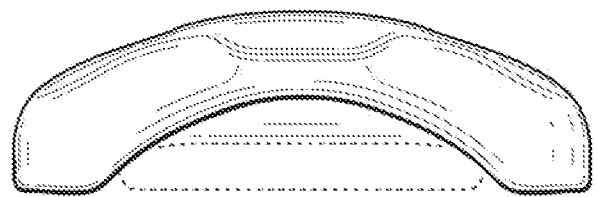
FIG. 7 is a rear view of a bicycle seat of the present invention.
Figure 8:
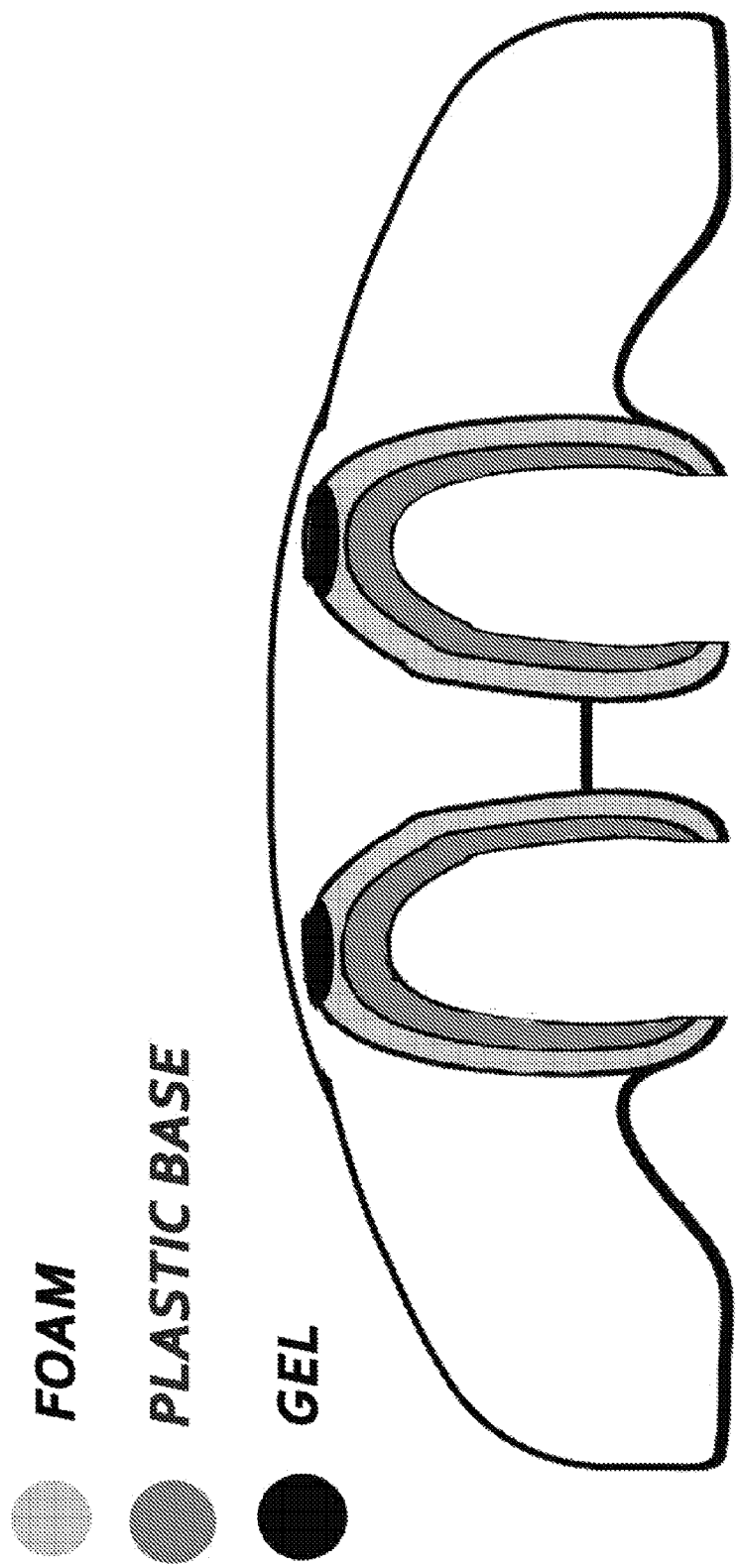
FIG. 8 is a front cross-sectional view of the two elongated protrusions at about station 55 mm, showing a gel layer forming a cushioned pubis bone support surface.

The frame is a one-piece plastic frame preferably made of an injection molded polypropylene, polyurethane, polymer, ABS copolymer, nylon or other like material. The shell/frame includes an attachment device for mounting the seat to the bicycle's frame, such as shown in FIG. 5. The attachment device and the outerwear surface are conventional and well-known to those skilled in the art and will not be discussed in detail.

The seat includes a small bifurcated front-end section (split nose), a medial section, and a rear-end section (tail). The seat widens from the nose to the back of the medial section and narrows thereafter to rear end, defining an overall length L and a width W.

The total length of the seat is 260-280 mm, preferably 270 mm. The total width is about 130-138 mm, preferably about 135.

Front-End Section (Split Nose)

The front end of the seat according to the present invention is a split nose formed by two elongated protrusions of substantially constant width extending forward from a medial section to the front surface.

The nose includes a longitudinally extending gap between these elongated protrusions of about 102-112 mm, which creates a narrow space where the rider's perineal/genital area is positioned without experiencing undue pressure or pain from the bicycle seat. The longitudinal gap is sized and contoured to provide pressure relief due to reduced contact of the private parts (perineum and/or genitalia, depending on forward or rearward riding position, respectively) of both male and female riders.

The depth of the longitudinal gap is about 90-100 mm but the exact dimensions corresponding to the depth, width, and height of the longitudinal gap may vary depending on the performance and comfort requirements of different riders and bicycles. These dimensions can be varied to accommodate different sized pelvic structures and intended uses.

Figure 9:
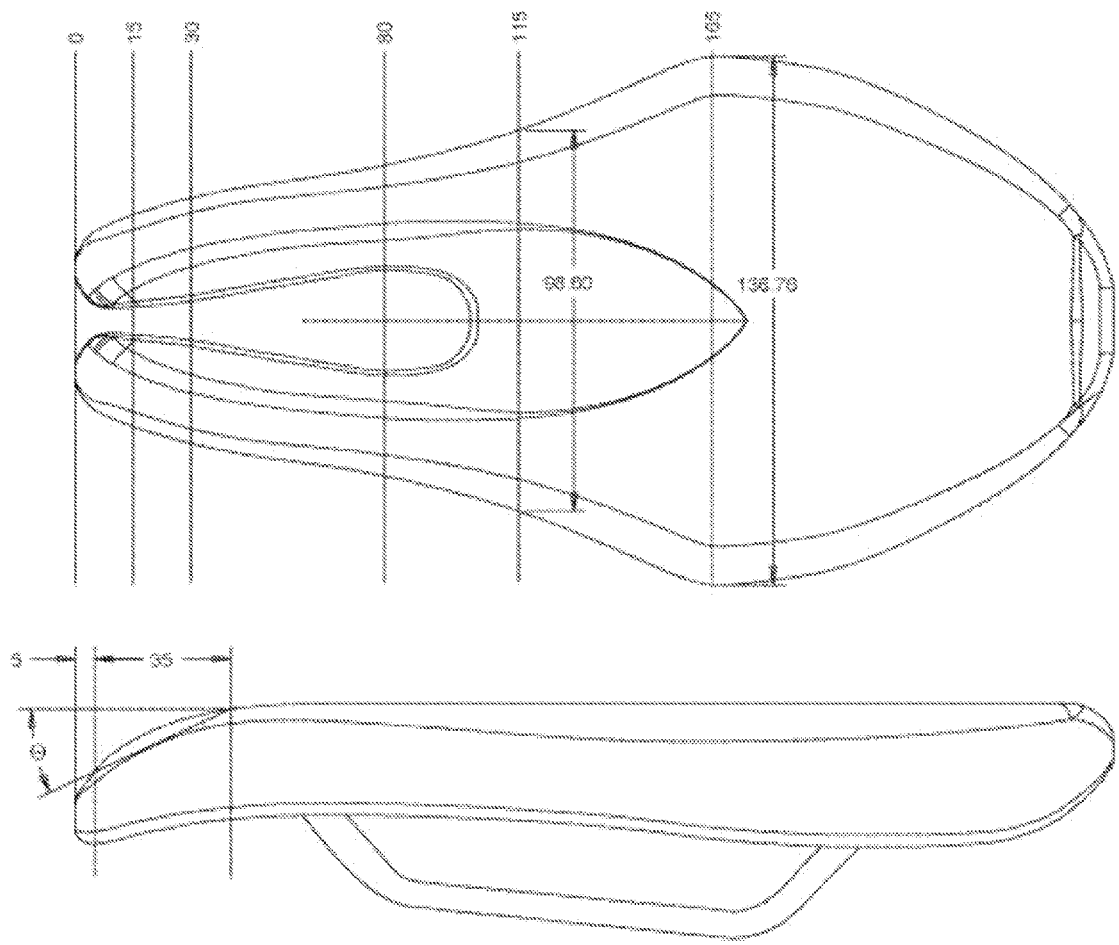
FIG. 9 contains a top view of a saddle, and a side view of the saddle defining a droop angle θ including a line drawn to intersect the top surface at stations 5 mm and 35 mm.
Figure 10:
FIG. 10 contains superimposed top views of a saddle of the present invention (bold lines) over a prior art saddle (center offset).
Figure 11:
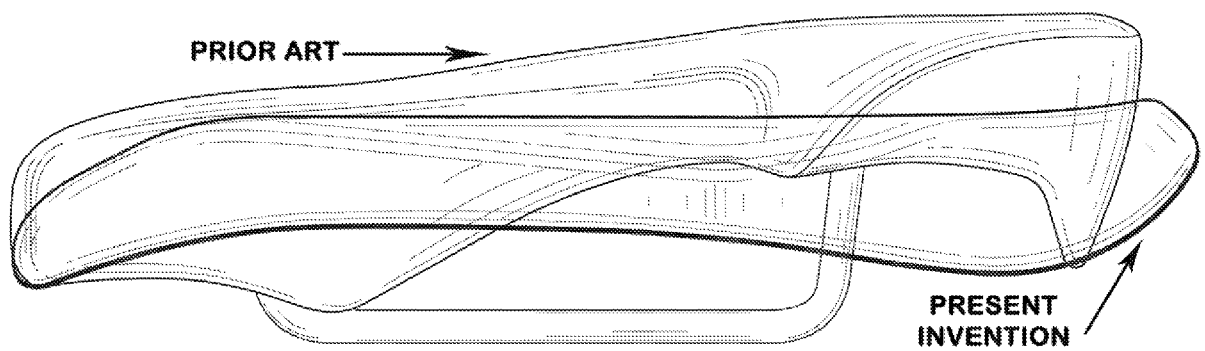
FIG. 11 contains superimposed side view of a saddle of the present invention (bold lines) over a prior saddle (thin lines).
Figure 12:
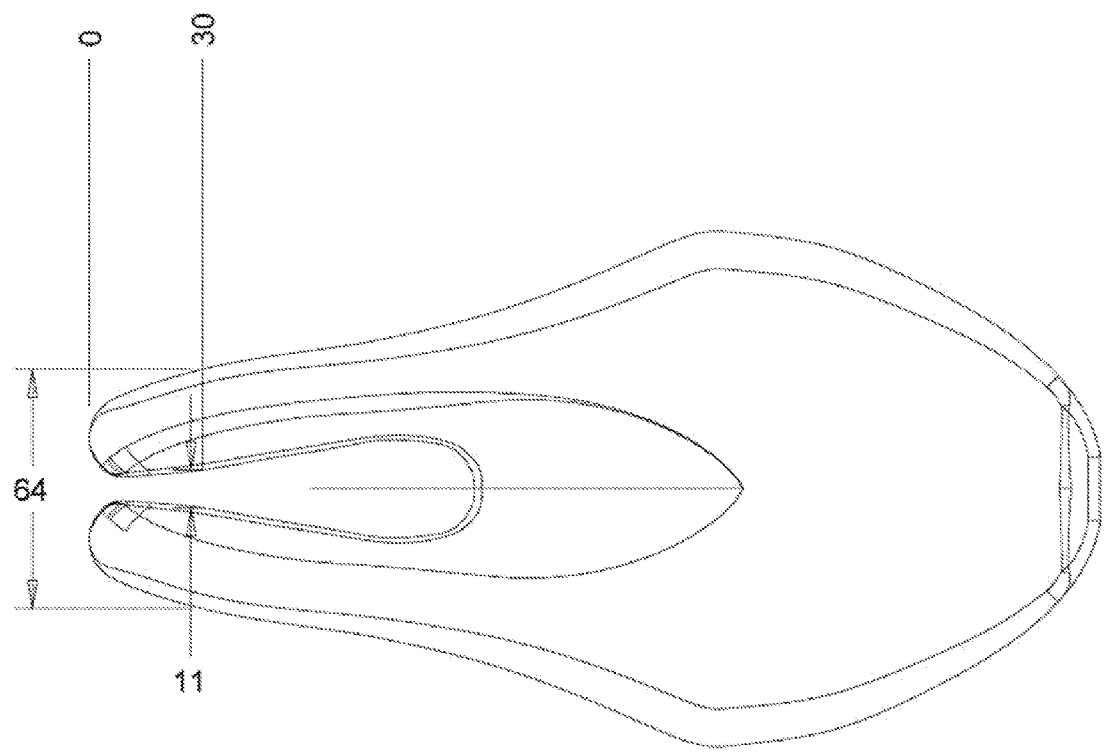
FIG. 12 contains a top view of a saddle.

The split nose section extends relatively far forward but drops away or droops at an angle θ (theta), as shown in FIG. 9. Having a drooped nose reduces or eliminates pressure on the superficial perineum area which may be produced by other bicycles seats.

Each half of the split nose is strategically positioned and padded to provide a cushioned pubis bone support surface having a substantially flat side profile. The split nose also provides support for the upper back portion of the rider's thighs, thereby reducing the weight to be supported by the buttocks.

A cutout separates the right, side nose from the left side nose at the front-end section of the seat. The longitudinally extending gap between said elongated protrusions is about 10 mm near the front and widens aft to about 30 mm, preferably 25 mm.

The present invention contemplates having the central groove in the form of a different shape such as a rectangle, ellipse, pear, or hyperbola.

The central gap and the cutout cooperate with each other to define an open space for relieving pressure on the pudendal arteries and nerves of a seat occupant; thus, the seat provides increased comfort during extended periods of use, due to a redistribution of the rider's weight.

Medial Section

The medial section includes an area that supports a rider's buttocks and tailbone, in FIG. 9 it extends from about station 115 to station 165. The sides of the medial section curve gently toward the area where the front arms begin to form, maintaining a width of at least 98 mm at a station 50 mm forward of the widest point on the saddle. This width serves to distribute the rider's weight without irritating the ham string muscle.

Rear End Section (Tail)

The top surface of the rear end section is substantially flat.

The tail is well-padded and relatively narrow compared to traditional seats. The widest point is approximately 130-1.38 mm, preferably 135 mm.

The present invention may include cushioning gel layer against any appreciable lateral movement relative to the shell, and be of a thickness and m a location which permits only limited up and down deflection. A thin gel layer may be located below the rider's ischial pelvic or sitting bones and genital areas.

However, if the gel layer extends downwardly onto the sloping side portions of the seat, it may cause excessive movement for the rider along with rubbing, and chafing of the skin. The gel layer should have sufficient thickness to provide adequate deformation to relieve excessive pressure on the pelvic bones so as to provide a comfortable ride.

A layer of relatively firm plastic foam is advantageously and preferably provided between the seat lower shell and the flexible cover to provide additional resilient support for the rider and for constraining the gel layer.

The seat of the present invention comprises combined features that provide full anatomical support and accommodation for areas of the pelvis including the surrounding tissues and musculature. It is exceptionally comfortable to use even for long periods of riding. It is light in weight, small, attractive in appearance, and streamlined. The seat weight is approximately 2.75-350 grams and its height is about 45 mm.

The seat of this invention includes a combination of features, including an extended drooped nose, wide medial section, cutout, and central gap, to provide greater and more even weight support to the rider. Thus, pressure upon the perineum/genital region is greatly diminished and sometimes eliminated, while the pudendal artery and the pudendal nerve are free of compression. As a result the scat is exceptionally comfortable for long periods of riding.

Seat for a Touring Bicycle

The seat for a touring bicycle is designed for maximum comfort. The present invention contemplates adding a high-density foam padding to the basic design and adding a leather covering.

The embodiments of the invention described above are to be considered illustrative and not restrictive; the scope of the invention being indicated by the appended claims. All changes which come within the meaning and range of equivalency of the claims are intended to be embraced therein.

The invention claimed is:

1. A split-nose bicycle seat, comprising:
   at rigid plastic base provided with attachment points for mounting the seat to a bicycle frame,
   a total length of the seat of about 260-280 mm,
   a split nose section formed b two elongated protrusions of substantially constant width extending forward from a medial section to a front surface,
   said elongated protrusions angle inwardly and have a total width of at least 60 mm at a station 30 mm aft of the front surface, a longitudinally extending gap between said elongated protrusions which is 102-112 mm long, and about 10 mm wide near the front and widens of to about 30 mm,
   a cushioned pubis bone support surface with a substantially flat top surface side profile over a majority of its length,
   a drooped nose section forward thereof defining a droop angle $\theta$ of about 25°,
   substantially vertical outer sides,
   said split nose section transitioning aft to a station having a width of about 130-1.38 mm at the widest point of the seat, and a width of at least 98 mm at a station 115 mm aft of the front surface,
   said medial section transitioning aft to a rear-end section.

2. The seat of claim 1. wherein the plastic base is covered by a foam cushion layer and said pubis bone support area has a gel cushion layer above the foam cushion layer.

3. The seat of claim 1, wherein the width at a station 50 mm forward of the widest point of the seat is about 98.6 mm.

4. The seat of claim 1, wherein the total length is about 270-275 mm.

5. The seat of claim 1, wherein the rear-end section is raised in comparison to said pubis bone support surface having a substantially flat side profile.

* * * * *